US008266548B2

(12) United States Patent
Denkel

(10) Patent No.: US 8,266,548 B2
(45) Date of Patent: Sep. 11, 2012

(54) HIERARCHY TREE MOVEMENT USING MULTI-TREE ANIMATION

(75) Inventor: Christian Denkel, Karlsruhe (DE)

(73) Assignee: SAP AG, Walldorf (DE)

( * ) Notice: Subject to any disclaimer, the term of this patent is extended or adjusted under 35 U.S.C. 154(b) by 526 days.

(21) Appl. No.: 12/492,900

(22) Filed: Jun. 26, 2009

(65) Prior Publication Data
US 2010/0333039 A1 Dec. 30, 2010

(51) Int. Cl.
*G06F 3/048* (2006.01)
(52) U.S. Cl. .................................. 715/853; 715/713
(58) Field of Classification Search .................. 715/854, 715/853, 713
See application file for complete search history.

(56) References Cited

U.S. PATENT DOCUMENTS

| | | | |
|---|---|---|---|
| 6,515,656 B1 * | 2/2003 | Wittenburg et al. | 345/418 |
| 7,242,413 B2 * | 7/2007 | Chu et al. | 345/619 |
| 7,360,175 B2 * | 4/2008 | Gardner et al. | 715/854 |
| 7,610,564 B1 * | 10/2009 | Pfohe et al. | 715/854 |
| 7,984,388 B2 * | 7/2011 | Dieberger et al. | 715/853 |

OTHER PUBLICATIONS

"jQuery Fade Menu Plugin", [Online]. Retreived from the Interenet: <URL: http://www.renderrobot.com/plugins/fademenu/demo.html#>, 1 pg.
"jQuery Plugins: Fade Menu", [*Online*]. Retrieved from Internet: <URL: http://plugins2.jquery.com/project/fademenu>, (Jun. 25, 2009), 2 pgs.

* cited by examiner

*Primary Examiner* — Namitha Pillai
(74) *Attorney, Agent, or Firm* — Schwegman Lundberg & Woessner P.A.

(57) ABSTRACT

In some example embodiments, a machine-readable medium provides instructions which, when executed by a machine, cause said machine to perform operations. The operations include displaying nodes in N number of levels of a first hierarchy tree on a display. The operations also include receiving input of a selected node of the nodes to open a level below the N number of levels of the first hierarchy tree. The operations include fading out a number of nodes at a highest level of the N number of levels from the first hierarchy tree. The operations include fading in at least one node of the number of nodes at the highest level of the N number of levels into the second hierarchy tree. Also, the operations include fading in at least one node at a level below the selected node into the first hierarchy tree on the display.

29 Claims, 12 Drawing Sheets

HIERARCHY TREE MOVEMENT USING MULTI-TREE ANIMATION

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright 2009, SAP AG. All Rights Reserved.

BACKGROUND

Viewing of hierarchy trees on a display can become problematic as the number of levels being viewed increases. This can be more problematic if the levels of the hierarchy tree being viewed increases in a limited viewing area. Specifically, if a viewer desires to view many levels of the hierarchy tree, some of the levels may not be viewable. This can confuse the viewer's understanding of the nodes at the different levels of the hierarchy tree relative to other nodes at other levels in the tree.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Figure 1:
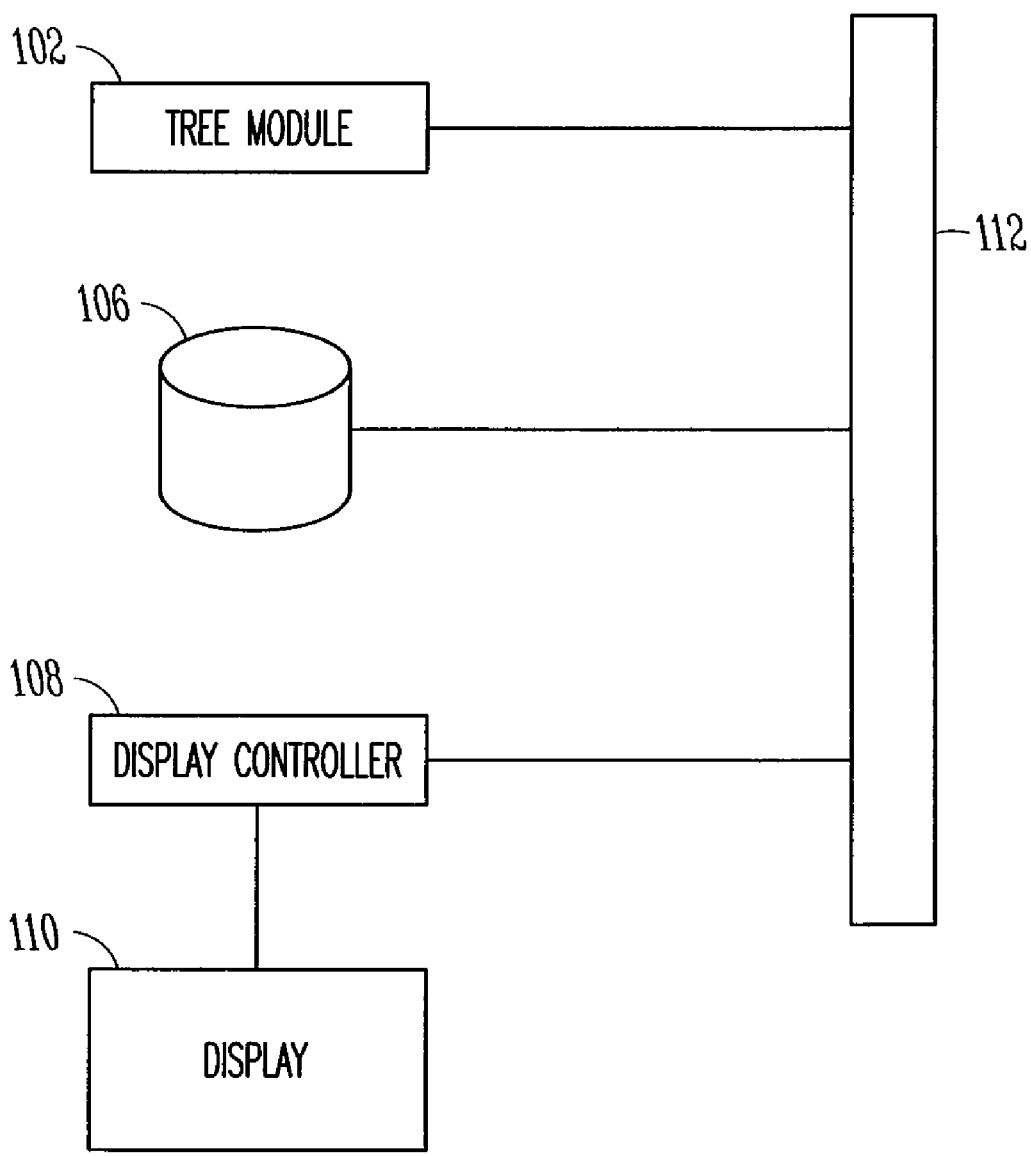
FIG. 1 is a system for displaying levels of a hierarchy tree across multiple hierarchy trees that includes animated movement, according to some example embodiments.

Methods, apparatus and systems for animatingly displaying of changes in viewing of multiple levels of a hierarchy tree across viewable multiple hierarchy trees are described. In the following description, numerous specific details are set forth. However, it is understood that embodiments of the invention may be practiced without these specific details. In other instances, well-known circuits, structures and techniques have not been shown in detail in order not to obscure the understanding of this description.

The term "hierarchy tree" and "tree" are used interchangeable herein and includes nodes that can represent any type of data that is displayed in a graphical form. Moreover, the tree as used herein can include any number of levels with any number of nodes within such levels. While described relative to a tree having a root node at the top with nodes below at lower levels, some example embodiments can be used relative to other types of data that include the display of nodes at different levels.

Some example embodiments enable the display of multiple levels of a hierarchy tree across multiple hierarchy trees on one or more displays, wherein animation is used to show changes/movement in levels displayed across the multiple trees. Some example embodiments can be useful in a limited viewing area of a display (e.g., a navigation window beside a document viewing window on the display). Accordingly, the use of a horizontal scroll bar can be avoided for navigation between nodes on the tree. In particular, only N (e.g., 1, 2, 3, etc.) number of levels are displayed on a given tree (first tree). If a viewer desires to see more levels, some example embodiments animatingly display movement of one or more levels from the first to a second tree. Moreover, the remaining tree nodes are animatingly moved to their new position in the first tree. At least simultaneously in part, the level being moved from the first tree to the second tree can be faded out of the first tree and faded into the second tree. Also, the second tree animatingly becomes visible as the new level is added. Accordingly, this animation assists the viewer to understand the fairly complex action. In particular, the fading and movement allow the viewer to visually understand the changes that are occurring to the hierarchy tree on the display. Such understanding can be even more important because changes to the hierarchy tree may be occurring in multiple areas. For example, parts of one hierarchy tree can be deleted while parts of the same or different hierarchy tree can be modified or added thereto. Thus, some example embodiments can enable better navigation among the nodes of the hierarchy trees and can enable a better user interface for the viewer.

As used herein, the terms "animation", "animated movement", "animatingly move", etc. are representative of any type of motion. For example, the animation can comprise a display of still images (e.g., two-dimensional or three-dimensional images) over time so that objects appear to move. Accordingly, the objects in the display appear to sequentially move over time as the still images are displayed. In examples herein, animation can comprise fading in and fading out of objects (e.g., a hierarchy tree, nodes of a hierarchy tree, line separators between hierarchy trees, etc.). In other examples, animation can comprise movement of objects (e.g., nodes of a hierarchy tree, etc.). In some example embodiments, one or both of the velocity and the acceleration of the movement/fading is variable. In some example embodiments, the velocity or the acceleration can vary based on the complexity of the hierarchy trees and/or the data therein. For example, the velocity or the acceleration can decrease as the number of nodes in the hierarchy trees increases. Alternatively or in addition, the velocity or the acceleration can decrease as the amount of data in the nodes increases. For example, the amount of data can be the number of characters across all nodes, the node having the largest number of characters, etc. The velocity and the acceleration can be configured such that the viewer can understand the changes, while precluding the data on the display from flickering. In some example embodiments, one or both the velocity and the acceleration of the movement/fading are configurable by the viewer. In some example embodiments, the display comprises a number of display zones, wherein the first hierarchy tree is displayed in the first display zone and the second hierarchy tree is displayed in the second display zone. These display zones can be marked by a line between the two zones (as further described below).

Example embodiments described hierarchy tree movement using two hierarchy trees on a display. However, embodiments are not so limited. In particular, two or more hierarchy trees can be used. Further, the different hierarchy trees can be displayed on one or more displays.

FIG. 1 is a system for displaying levels of a hierarchy tree across multiple hierarchy trees that includes animated movement, according to some example embodiments. A system 100 comprises a tree module 102, a machine-readable medium 106, a display controller 108 and a display 110. In some embodiments, the system 100 is representative of a computer, wherein a communication bus 112 couples together the tree module 102, the machine-readable medium 106 and the display controller 108. Alternatively or in addition, components of the system 100 are distributed over a number of computers that are coupled together through a network. For example, the tree module 102, the machine-readable medium 106, the display controller 108 and the display 110 are shown as being in a same computer system 100, embodiments are not so limited. The tree module 102, the machine-readable medium 106, the display controller 108 and the display 110 may be on separate systems.

In some example embodiments, the machine-readable medium 106 includes tangible volatile and/or non-volatile media (e.g., read only memory (ROM), random access memory (RAM), magnetic disk storage media, optical storage media, flash memory devices, etc.). The machine-readable medium 106 stores files that include one or more hierarchy trees as described herein.

In some example embodiments, the tree module 102 and the display controller 108 are applications or parts of an application used to display multiple hierarchy trees. The tree module 102 and the display controller 108 can be software, hardware, firmware or a combination thereof for executing the various operations described herein, according to some example embodiments.

Operations, according to some example embodiments, are now described. In certain embodiments, the operations are performed when instructions residing on machine-readable media (e.g., software) are executed, while in other embodiments, the methods are performed by hardware or other logic (e.g., digital logic).

Figure 2:
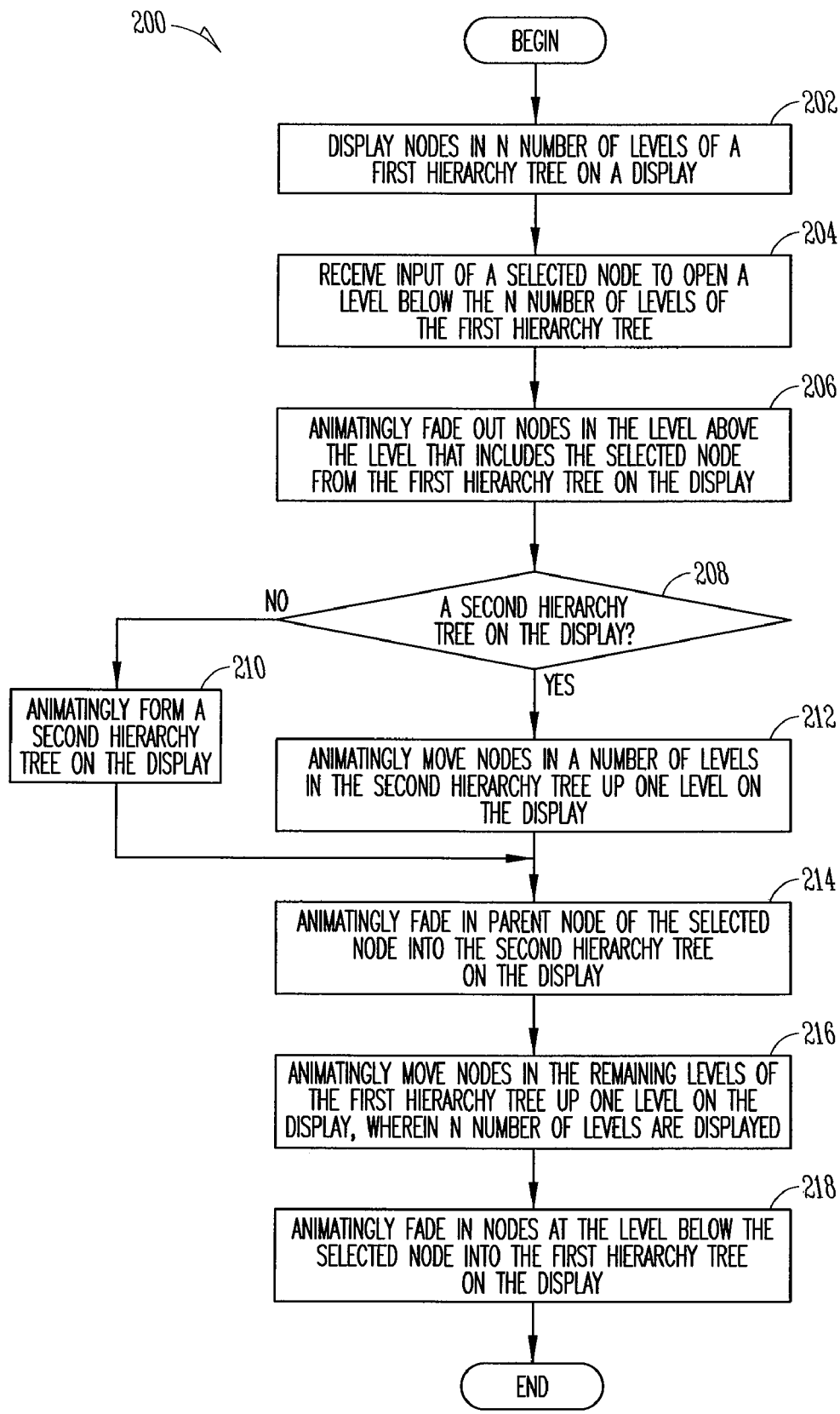
FIG. 2 is a diagram of a method to show movement in a hierarchy tree using multi-tree animation as lower levels of the hierarchy tree are shown (moving down the hierarchy tree), according to some example embodiments.
Figure 3:
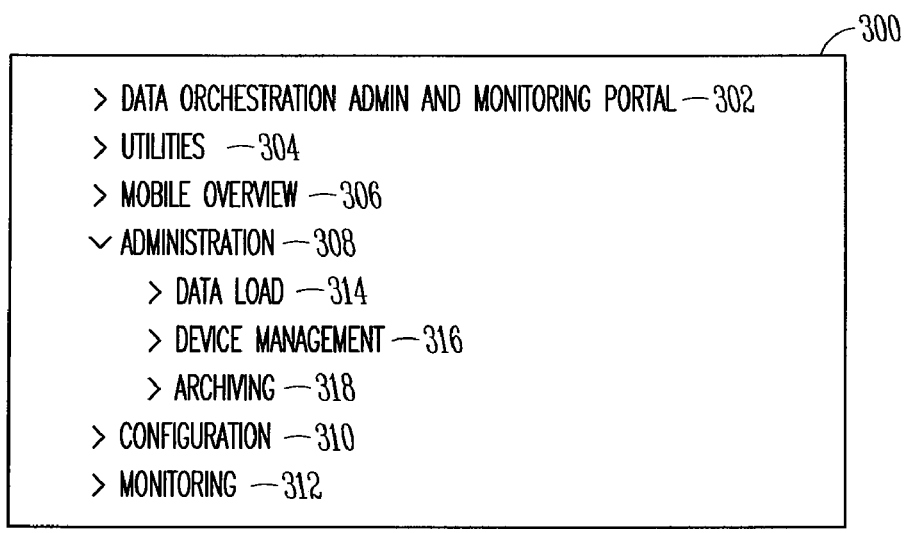
FIG. 3 is a graphical user interface showing a first hierarchy tree, according to some example embodiments.
Figure 4:
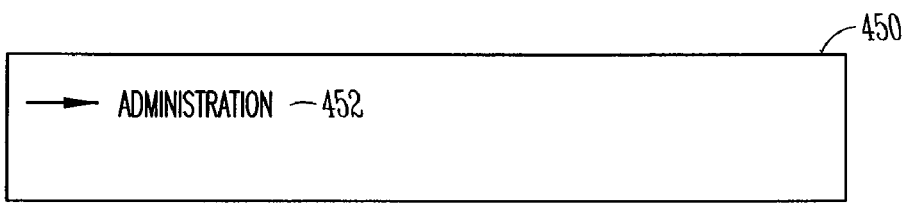
FIG. 4 is a graphical user interface showing movement within the first hierarchy tree using multi-tree animation, according to some example embodiments.
Figure 4:
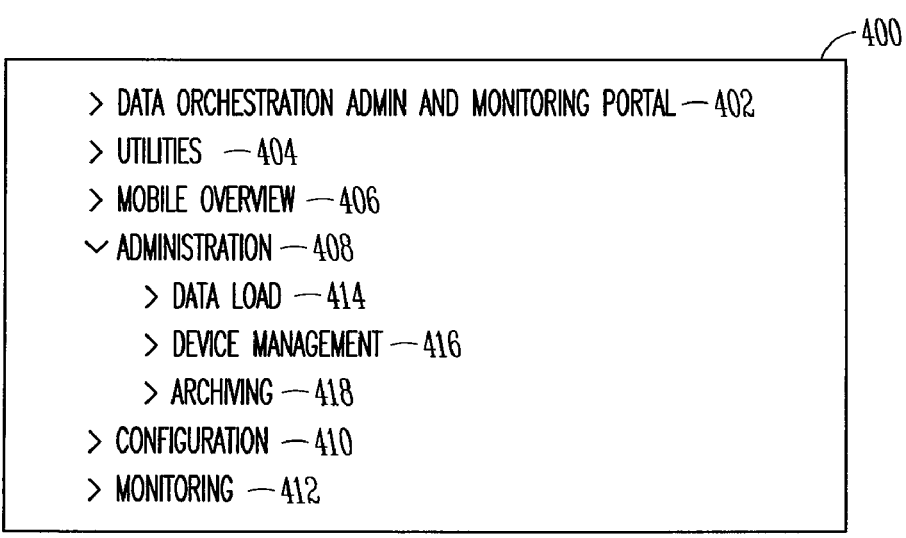
Figure 5:
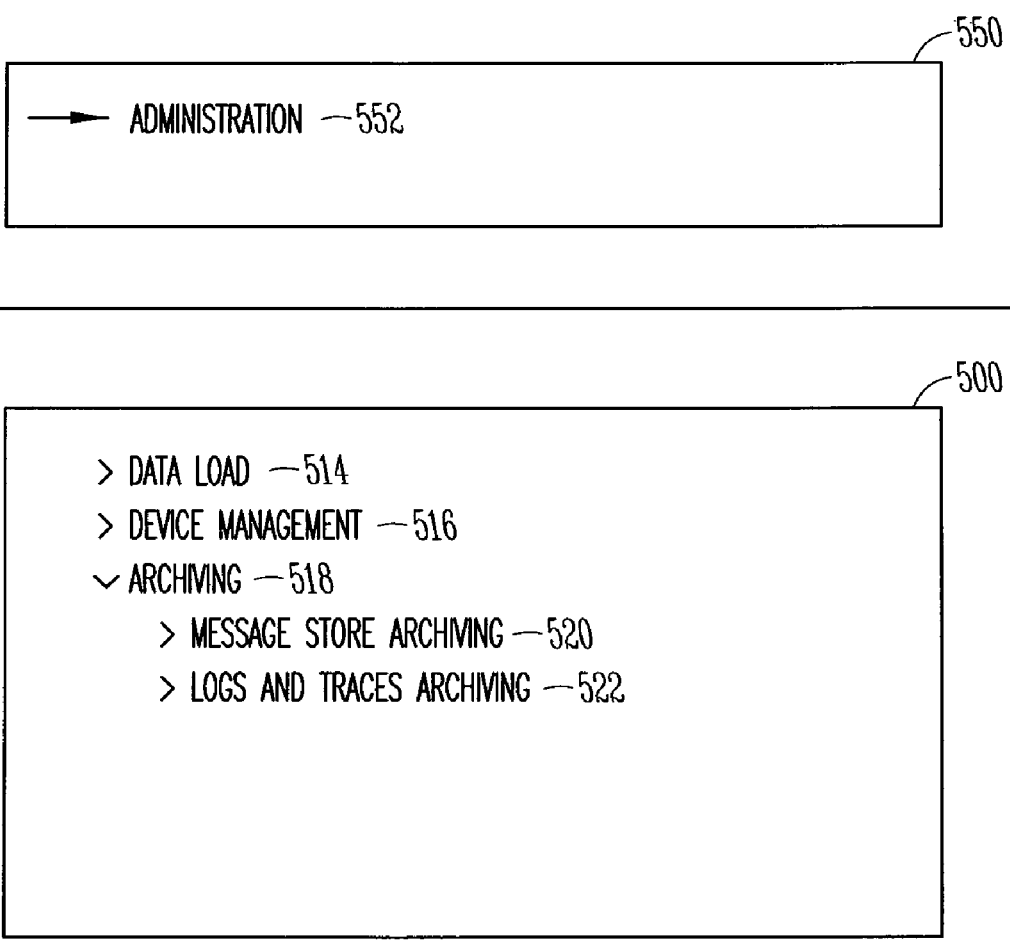
FIG. 5 is a graphical user interface showing the first and second hierarchy trees after using multi-tree animation, according to some example embodiments.
Figure 6:
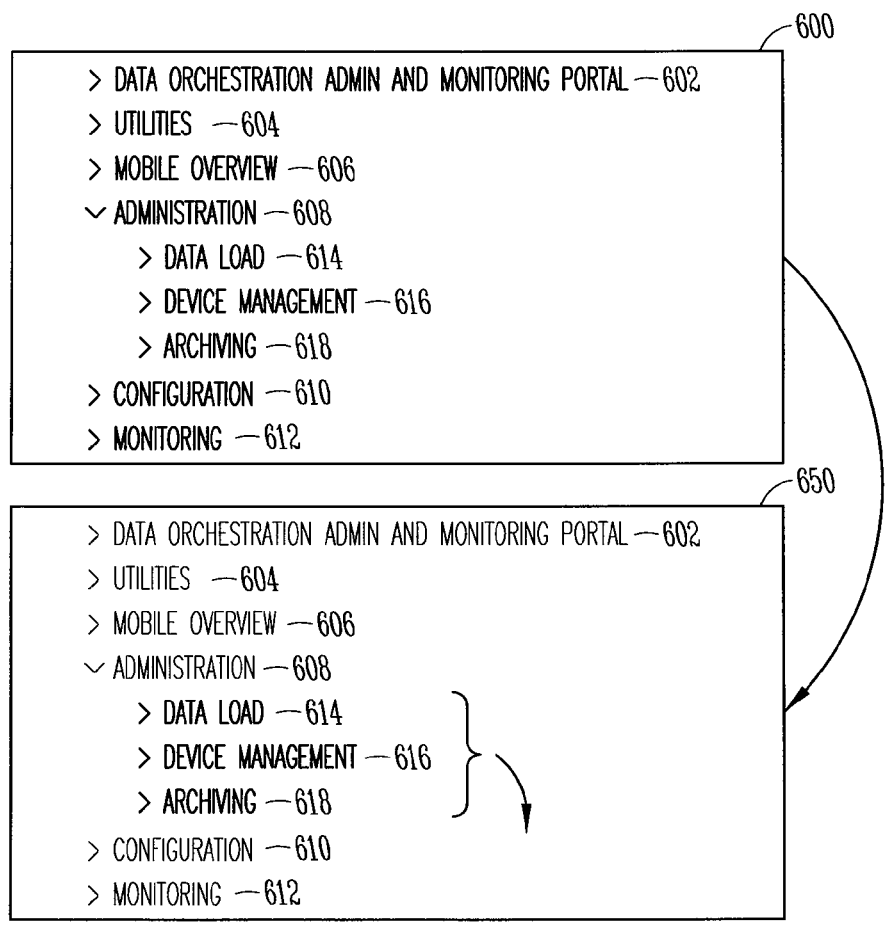
FIGS. 6-7 show graphical user interfaces over time of movement in a hierarchy tree using multi-tree animation as lower levels of the hierarchy tree are shown (moving down the hierarchy tree), according to some example embodiments.
Figure 7:
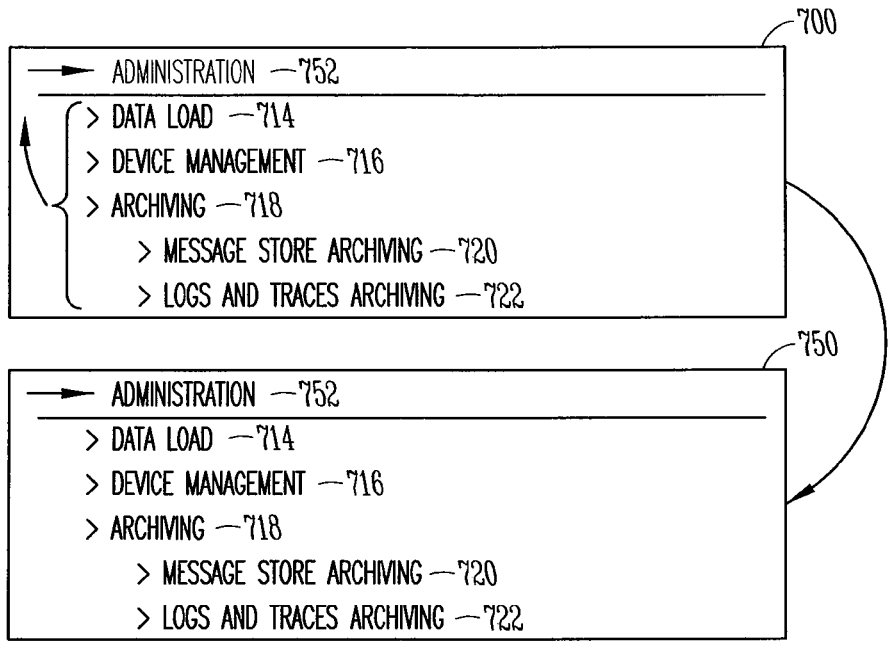
Figure 8:
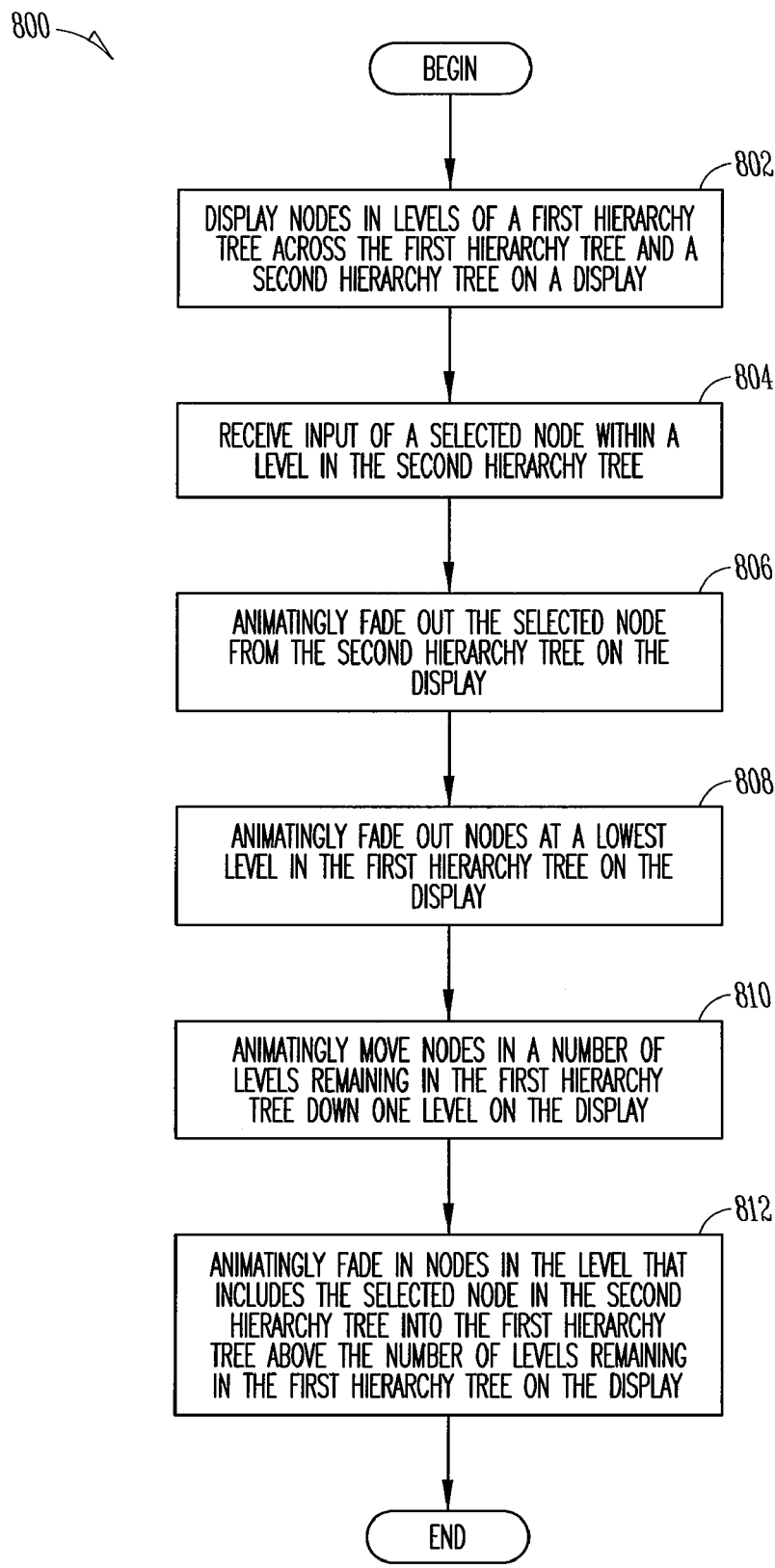
FIG. 8 is a diagram of a method to show movement in a hierarchy tree using multi-tree animation as lower levels of the hierarchy tree are closed (moving up the hierarchy tree), according to some example embodiments.
Figure 9:
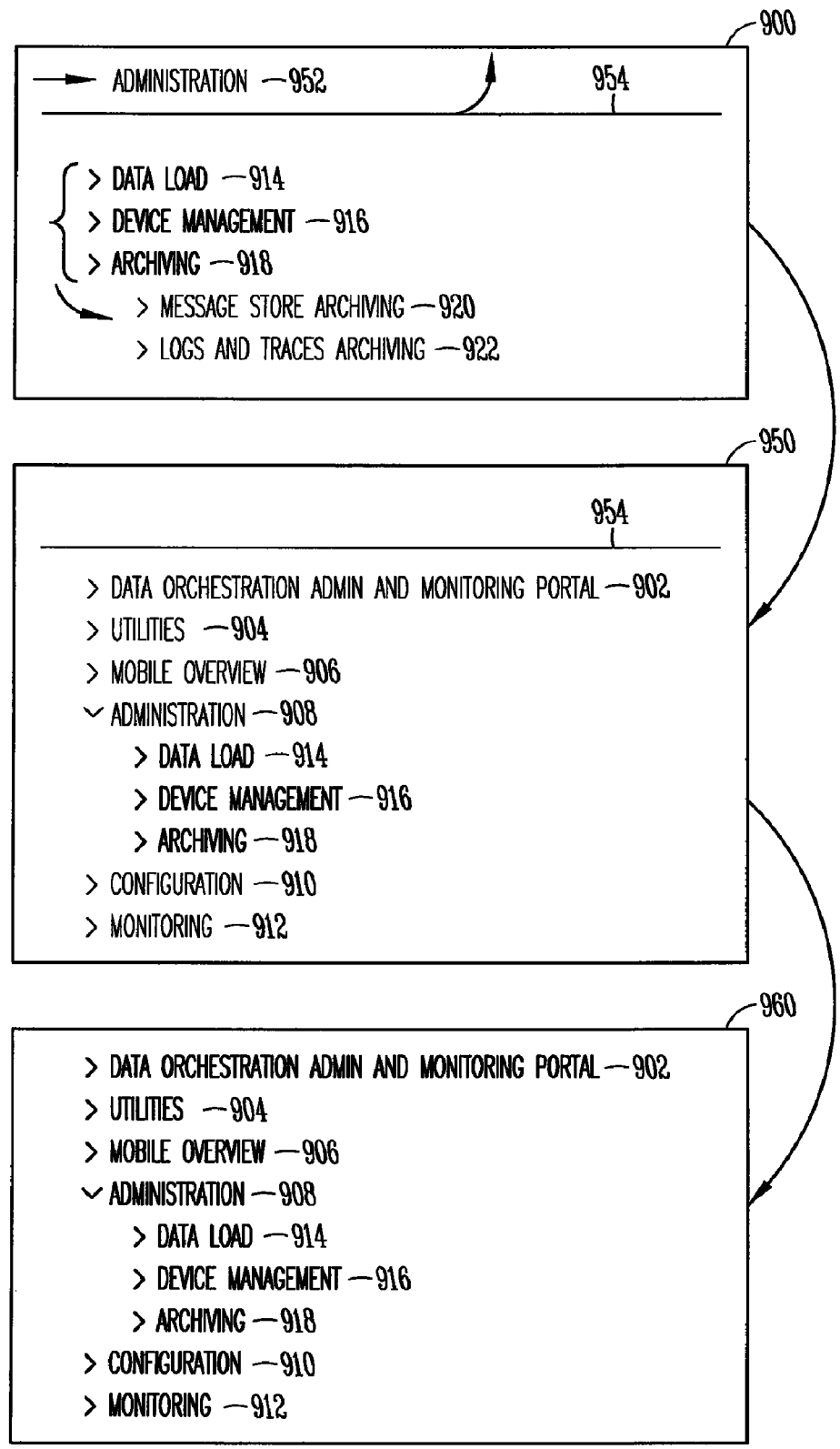
FIG. 9 shows graphical user interfaces over time of movement in a hierarchy tree using multi-tree animation as lower levels of the hierarchy tree are closed (moving up the hierarchy tree), according to some example embodiments.

FIGS. 2 and 8 are diagrams of different methods for displaying levels of a hierarchy tree across multiple hierarchy trees that includes animated movement, according to some example embodiments. Specifically, FIG. 2 is a diagram of a method to show movement in a hierarchy tree using multi-tree animation as lower levels of the hierarchy tree are shown (moving down the hierarchy tree). Alternatively, FIG. 8 is a diagram of a method to show movement in a hierarchy tree using multi-tree animation as lower levels of the hierarchy tree are closed (moving up the hierarchy tree). FIGS. 2 and 8 are described with reference to different graphical user interfaces and screen shots of graphical user interfaces (illustrated in FIGS. 3-7 and 9-20). In particular, FIGS. 3-5 are different graphical user interfaces showing the animated movement across multiple hierarchy trees, according to some example embodiments. FIGS. 6-7 show graphical user interfaces over time of movement in a hierarchy tree using multi-tree animation as lower levels of the hierarchy tree are shown (moving down the hierarchy tree), according to some example embodiments. FIG. 9 shows graphical user interfaces over time of movement in a hierarchy tree using multi-tree animation as lower levels of the hierarchy tree are closed (moving up the hierarchy tree), according to some example embodiments. FIGS. 10-20 are screen shots of graphical user interfaces for displaying levels of a hierarchy tree across multiple hierarchy trees that includes animated movement, according to some example embodiments. Accordingly, the descriptions of FIGS. 3-7 and 9-20 are incorporated into the description of the diagrams of FIGS. 2 and 8.

FIG. 2 is a diagram of a method to show movement in a hierarchy tree using multi-tree animation as lower levels of the hierarchy tree are shown (moving down the hierarchy tree), according to some example embodiments. A method 200 is described with reference to FIG. 1. In some example embodiments, the method 200 is performed by the tree module 102. The method 200 commences at block 202.

At block 202, the tree module 102 displays nodes in N number of levels of a first hierarchy tree on the display 110. In some example embodiments, N equals 1, 2, 3, etc. Some example embodiments have application where the viewing area for the hierarchy tree is limited. In particular, some example embodiments enable viewing of more levels of a hierarchy tree in a limited viewing area. To illustrate, FIG. 3 is a graphical user interface showing a first hierarchy tree, according to some example embodiments. A hierarchy tree 300 includes two levels. A first level includes nodes 302-312.

A second level that is below node 308 includes nodes 314-318.

Figure 10:
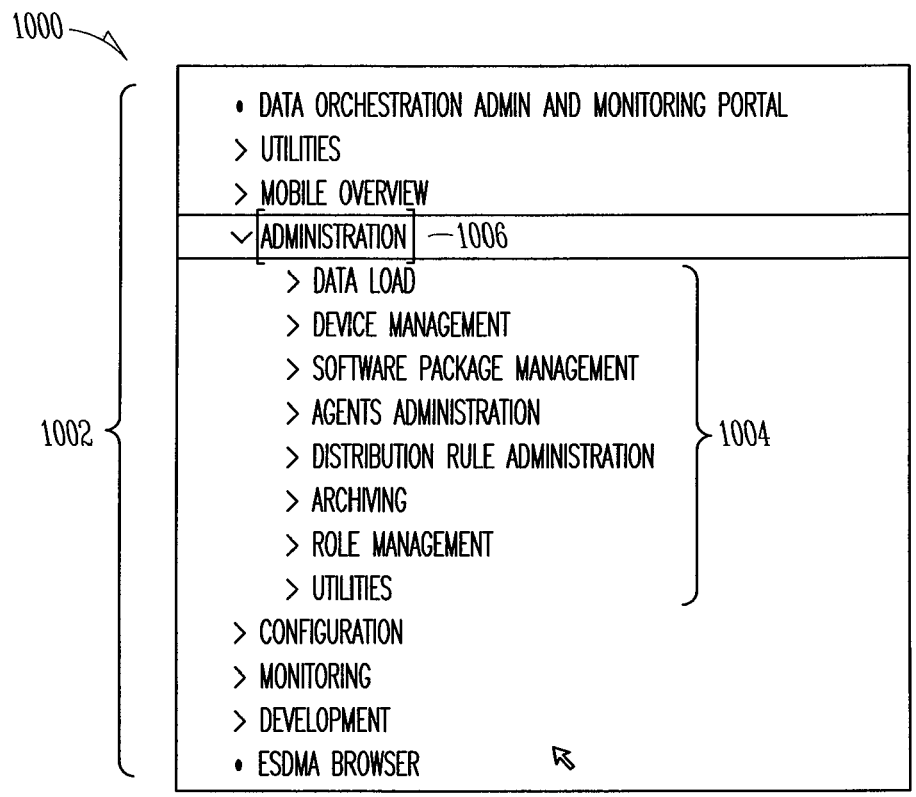
FIG. 10 is a screen shot of a graphical user interface of a hierarchy tree having N number of levels, according to some example embodiments.

To further illustrate, FIG. 10 is a screen shot of a graphical user interface of a hierarchy tree having N number of levels, according to some example embodiments. A screen shot 1000 shows the first hierarchy tree with N number of levels (N equaling two in this example). The first hierarchy tree includes a first level 1002 and a second level 1004. A second level 1004 is below a node 1006 in the first level 1002. Returning to FIG. 2, the method 200 continues at block 204.

Figure 11:
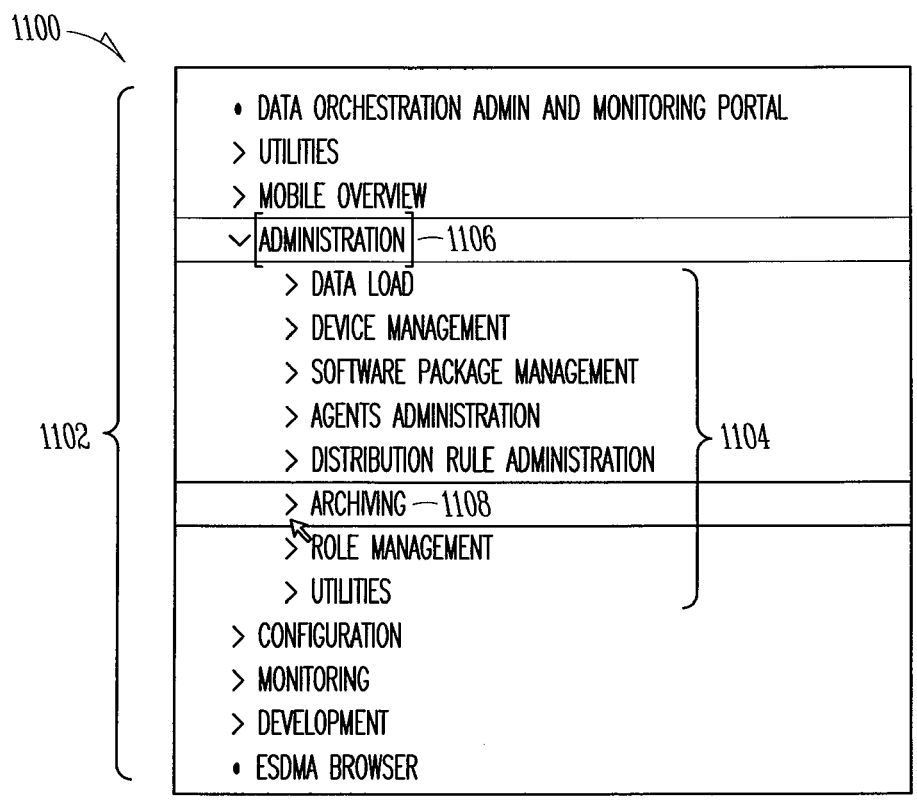
FIG. 11 is a screen shot of a graphical user interface of a hierarchy tree having N number of levels after receiving input of selected node, according to some example embodiments.

At block 204, the tree module 102 receives input selection of a node in the first hierarchy tree to open a level below the N number of levels of the first hierarchy tree. Accordingly, the selected node is a parent node of the nodes in the N number of levels in the first hierarchy tree. For example, the tree module 102 can receive the input selection of the node from a user that can be viewing the hierarchy tree. The user can input using a number of different input devices (keyboard, mouse, etc.). An example computer illustrating possible input devices is described in more detail below. Alternatively or in addition, the input selection can be received from various computer components (e.g., software, hardware, firmware, etc.). With reference to FIG. 3, the node 318 of the first hierarchy tree 300 is selected. To further illustrate, FIG. 11 is a screen shot of a graphical user interface of a hierarchy tree having N number of levels after receiving input of selected node, according to some example embodiments. A screen shot 1100 shows the first hierarchy tree with N number of levels (N equaling two in this example). The first hierarchy tree includes a first level 1102 and a second level 1104. A second level 1104 is below a node 1106 in the first level 1102. A node 1108 in the second level 1104 is the selected node. Returning to FIG. 2, the method 200 continues at block 206.

At block 206, the tree module 102 animatingly fades out nodes in the level above the level that includes the selected node from the first hierarchy tree on the display 110. To illustrate, FIG. 4 is a graphical user interface showing movement within the first hierarchy tree using multi-tree animation, according to some example embodiments. In particular, FIG. 4 illustrates animated movement of nodes after the input selection of a node within the hierarchy tree 300 of FIG. 3. FIG. 4 includes a first hierarchy tree 400 (corresponding to the first hierarchy tree 300 of FIG. 3) in a first display zone of the display. FIG. 4 also includes a second hierarchy tree 450 in a second display zone of the display (described in more detail below). The first hierarchy tree 400 includes two levels. A first level includes nodes 402-412 (corresponding to the nodes 302-312 of FIG. 3). A second level that is below the node 408 includes nodes 414-418 (corresponding to nodes 314-318 of FIG. 3). As noted above, the input selection for this example is the node 318 of FIG. 3 (corresponding to the node 418 of FIG. 4). Accordingly as part of the animation movement to allow a viewer to more easily track the relationship among the different nodes at the different levels of the first hierarchy tree, the nodes to be moved from the first hierarchy tree 400 to the second hierarchy tree 450 are faded out from the first hierarchy tree 400. With reference to FIG. 4, the nodes 402-412 are shown as fading out (relative to other parts of the hierarchy tree 400).

To illustrate, FIG. 6 shows graphical user interfaces over time of movement in a hierarchy tree using multi-tree animation as lower levels of the hierarchy tree are shown (moving down the hierarchy tree), according to some example embodiments. FIG. 6 includes a first graphical user interface 600 at a first time prior to the selecting of a node. FIG. 6 includes a second graphical user interface 650 at a second time after the selecting of the node (as shown by the arrow between the first graphical user interface 600 and the second graphical user interface 650). Both the first graphical user interface 600 and the second graphical user interface 650 show the first hierarchy tree at the two different points in time. The first hierarchy tree includes two levels. A first level includes nodes 602-612 (corresponding to the nodes 302-312 of FIG. 3). A second level that is below the node 608 includes nodes 614-618 (corresponding to nodes 314-318 of FIG. 3). As shown in the second graphical user interface 650, the nodes 602-612 are fading out and the nodes 614-618 are moving downward. To further illustrate in FIG. 11, the selected node is the node 1108. The level above the node 1108 (the first level 1102) are fading out. Returning to FIG. 2, the method 200 continues at block 208.

At block 208, the tree module 102 determines whether a second hierarchy tree is on the display 110. In particular, if the number of levels attempted to be previously viewed of the hierarchy tree is greater than N, a second hierarchy tree has already been formed on the display 110. In other words, once the number of levels of the hierarchy tree attempted to be viewed is greater than N, the tree module 102 forms a second hierarchy tree. If a second hierarchy tree is already formed on the display, the method 200 continues at block 214 (described below). Otherwise, the method 200 continues at block 210.

At block 210, the tree module 102 animatingly forms a second hierarchy tree on the display 110. The first hierarchy tree can be repositioned to provide a position on the display 110. Initially, the second hierarchy tree can be unfilled. With reference to FIG. 4, the tree module 102 animatingly moves the first hierarchy tree 400 downward and forms the second hierarchy tree 450 above. Alternatively, the tree module 102 can animatingly form the second hierarchy tree above, to the left or right of the first hierarchy tree.

To further illustrate, FIG. 7 shows graphical user interfaces over time of movement in a hierarchy tree using multi-tree animation as lower levels of the hierarchy tree are shown (moving down the hierarchy tree), according to some example embodiments. In particular, FIG. 7 shows the continuation of movement of the graphical user interfaces from FIG. 6. FIG. 7 includes a first graphical user interface 700 at a first time after the forming of a second hierarchy tree and the placing of a node therein. FIG. 7 also includes a second graphical user interface 750 at a second time after completing of movement after selecting of the node. Both the first graphical user interface 700 and the second graphical user interface 750 show the first and the second hierarchy trees at the two different points in time. The first hierarchy tree includes two levels. A first level includes nodes 714-718 (corresponding to the nodes 514-518 of FIG. 5). A second level that is below the node 718 includes nodes 720-722 (corresponding to nodes 520-522 of FIG. 5). The second hierarchy tree includes a node 752 (corresponding to the node 552 of FIG. 5). As shown from the second graphical user interface 650 of FIG. 6 to the first graphical user interface 700 of FIG. 7, a second hierarchy tree is formed. Also as shown from the first graphical user interface 700 to the second graphical user interface 750, the nodes 720-722 are formed at a level below the node 718 while the nodes at the two different levels of the first hierarchy tree are animatingly moved upward to the top of the first hierarchy tree. While examples show the second hierarchy tree as a sub part of the first hierarchy tree, embodiments are not so limited. In some example embodiments, the second hierarchy tree can comprise any number of levels that include any number of nodes therein. In particular, the second hierarchy tree can be a full tree and is not limited to a sub part of the first hierarchy tree. For example, in some example embodiments, only the parent node of the selected node is moved to the second hierarchy tree. In other example embodiments, all nodes at the level of the parent node are moved to the second hierarchy tree. Further, any number of levels can be moved from the first hierarchy tree to the second hierarchy tree. For example, the node 720 ("message store archiving") can be selected, thereby causing a node at another level (the node 718) to move to the second hierarchy tree. Returning to FIG. 2, the method 200 continues at block 208.

Figure 12:
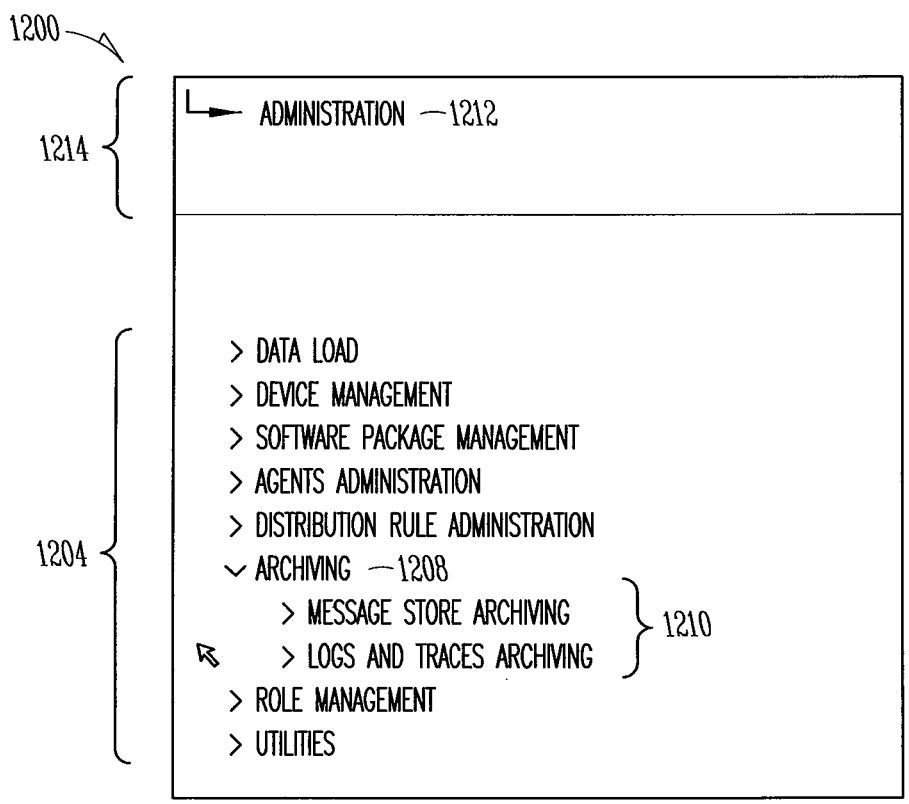
FIG. 12 is a screen shot of a graphical user interface of a hierarchy tree having levels being displayed across two different hierarchy trees, according to some example embodiments.

To further illustrate, FIG. 12 is a screen shot of a graphical user interface of a hierarchy tree having levels being displayed across two different hierarchy trees, according to some example embodiments. A screen shot 1200 shows the first hierarchy tree with N number of levels (N equaling two in this example). The first hierarchy tree includes a first level 1204 and a second level 1210. The first level 1204 includes the selected node (a node 1208). A second hierarchy tree is created in a section 1214 in the screen shot 1200. The second hierarchy tree includes a node 1212. The node 1212 is the parent node of selected node 1208. Returning to FIG. 2, the method 200 continues at block 212.

At block 212, the tree module 102 animatingly moves nodes in the number of levels in the second hierarchy tree up one level in the display. With reference to FIG. 4, if the second hierarchy tree 450 already included a node at upper levels relative to the node being faded into the second hierarchy tree 450, the tree module 102 moves the node up in its relative position in the second hierarchy tree 450. The method 200 continues at block 214.

At block 214, the tree module 102 animatingly fades in a parent node of the selected node (see block 204 above) into the second hierarchy tree on the display 110. With reference to FIG. 4, the tree module 102 fades in the node 452 into the second hierarchy tree 450. In particular, the node 452 is shown as fading in (relative to the other parts of FIG. 4). The node 452 is the node 408 that is being faded out of the first hierarchy tree 400 (as described above). With reference to FIG. 7, the node 752 is faded into the second hierarchy tree. While described such that only the parent node of the selected node is faded into the second hierarchy tree, in other embodiments, some or all of the other nodes faded out from the first hierarchy tree can be faded into the second hierarchy tree. For example, all of the nodes in that same level of the parent node could be faded into the second hierarchy tree. With reference to FIG. 12, the parent node of the selected node (the node 1208) is the node 1212 (shown being faded into the second hierarchy tree). Returning to FIG. 2, the method 200 continues at block 216.

At block 216, the tree module 102 animatingly moves nodes in the remaining levels of the first hierarchy tree up one level on the display (so that a total of N number of levels are displayed in the first hierarchy tree). As described above, limiting the number of levels being viewed in the first hierarchy tree enables a viewer to view the hierarchy tree on the display without using a scroll bar. Also, the second hierarchy tree enables the viewer to view other levels of the first hierarchy tree to provide context of the levels in the first hierarchy tree. To illustrate, FIG. 5 is a graphical user interface showing the first and second hierarchy trees after using multi-tree animation, according to some example embodiments. In particular, FIG. 5 illustrates the first hierarchy tree 400 and the second hierarchy tree 450 of FIG. 4 have animatingly moved. FIG. 5 includes a first hierarchy tree 500 in a first display zone and a second hierarchy tree 552 in a second display zone (corresponding to the first hierarchy tree 400 and the second hierarchy tree 450, respectively). The first hierarchy tree 500 includes N number of levels. In this example, N equals two. A first level of the first hierarchy tree 500 includes nodes 514-518 (corresponding to the nodes 414-418 of FIG. 4). A second level that is below the node 518 includes nodes 520-522. The second hierarchy tree 550 includes a node 552 (corresponding to the node 452 of FIG. 4). As shown by the change in positions from FIG. 4 to FIG. 5, the nodes remaining (the nodes 514-518) in the first hierarchy tree 500 are moved up one level on the display 110. With reference to FIG. 7, the nodes 714-718 are moved up one level in the first hierarchy tree on the display (as described above).

Figure 13:
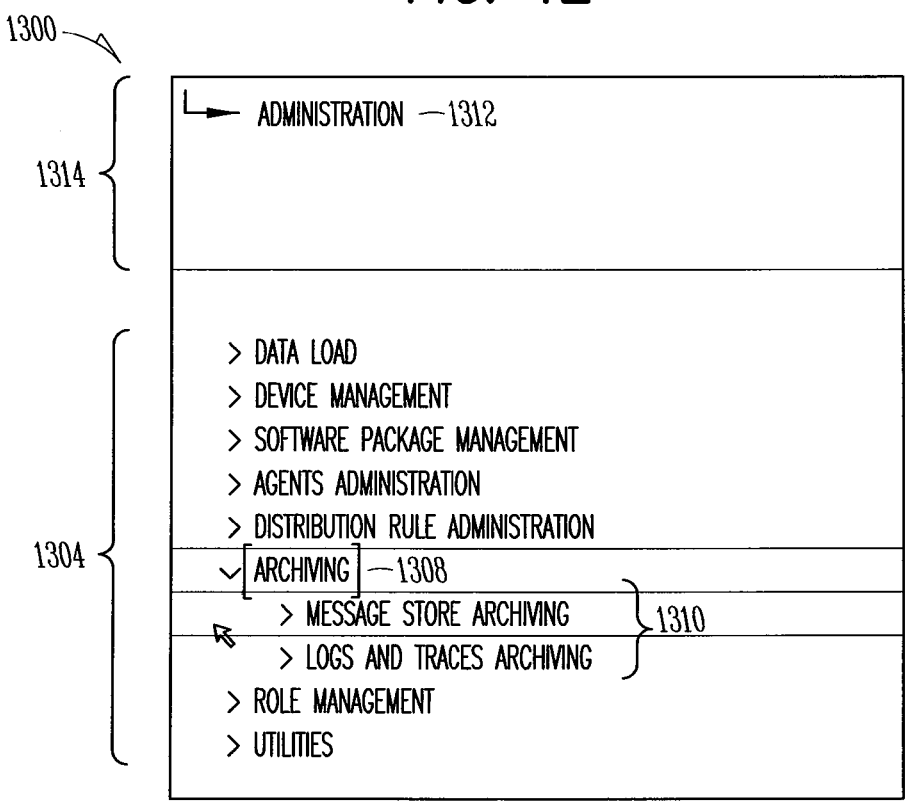
FIG. 13 is a screen shot of a graphical user interface of a hierarchy tree having levels being displayed across two different hierarchy trees with remaining levels of the first hierarchy tree animatingly moved to their new positions, according to some example embodiments.

To further illustrate, FIG. 13 is a screen shot of a graphical user interface of a hierarchy tree having levels being displayed across two different hierarchy trees with remaining levels of the first hierarchy tree animatingly moved to their new positions, according to some example embodiments. A screen shot 1300 shows the first hierarchy tree with N number of levels (N equaling two in this example). The first hierarchy tree includes a first level 1304 and a second level 1310. The first level 1304 includes the selected node (a node 1308). A second hierarchy tree is created in a section 1314 in the screen shot 1300. The second hierarchy tree includes a node 1312. The node 1312 is the parent node of selected node 1308. As shown, the nodes in the first level 1304 and the second level 1310 are moved up the first hierarchy tree (compare node position relative to the node position in the screen shot 1200 of FIG. 12). Returning to FIG. 2, the method 200 continues at block 218.

At block 218, the tree module 102 animatingly fades in nodes at the level below the selected node into the first hierarchy tree on the display. With reference to FIG. 5, the tree module 102 fades in the nodes 520-522 below the selected node 518. With reference to FIG. 7, the nodes 720-722 are animatingly faded in below the selected node (the node 718) in the first hierarchy tree on the display (as described above). With reference to FIG. 12, the nodes in the second level 1310 are faded in below the selected node (the node 1308). Returning to FIG. 2, the method 200 is complete.

The operations of moving up the hierarchy tree are now described. In particular, FIG. 8 is a diagram of a method to show movement in a hierarchy tree using multi-tree animation as lower levels of the hierarchy tree are closed (moving up the hierarchy tree), according to some example embodiments. A method 800 is described with reference to FIG. 1. In some example embodiments, the method 800 is performed by the tree module 102. The method 800 commences at block 802.

At block 802, the tree module 102 displays nodes in levels of a first hierarchy tree across the first hierarchy tree and a second hierarchy tree on the display 110. In some example embodiments, only N number of levels are displayed in the first hierarchy tree. One or more higher levels relative to the N number of levels are displayed in the second hierarchy tree. In some example embodiments, N equals 1, 2, 3, etc. In contrast to beginning with only displaying levels in first hierarchy tree (like in the operations of the method 200), the method 800 begins with displaying levels in the first hierarchy tree and the second hierarchy tree. Returning to FIG. 5 to illustrate, the first hierarchy tree 500 includes N number of levels, and the second hierarchy tree 552 includes one level above the N number of levels (as described above). With reference to the different screen shots in FIGS. 10-20, FIG. 13 includes the screen shot 1300 having the first and second hierarchy trees (as described above). The method 800 continues at block 804.

At block 804, the tree module 102 receives input selection of a node in the second hierarchy tree. For example, the tree module 102 can receive the input selection of the node from a user that can be viewing the hierarchy trees. The user can input using a number of different input devices (keyboard, mouse, etc.). An example computer illustrating possible input devices is described in more detail below. Alternatively or in addition, the input selection can be received from various computer components (e.g., software, hardware, firmware, etc.). With reference to FIG. 5, the node 552 of the second hierarchy tree 550 is selected.

To further illustrate, FIG. 9 shows graphical user interfaces over time of movement in a hierarchy tree using multi-tree animation as lower levels of the hierarchy tree are closed (moving up the hierarchy tree), according to some example embodiments. FIG. 9 includes a first graphical user interface 900 at a first time as two different hierarchy trees are being displayed, after a node from the second hierarchy tree has been selected. In particular, after a node 952 from the second hierarchy tree is selected, the node 952 is fading out. The first hierarchy tree includes two levels. A first level and a second level include nodes 914-918 and nodes 920-922, respectively. The first graphical interface 900 also include a line 954 positioned between the first hierarchy tree and the second hierarchy tree. The nodes 920-922 are also fading out. FIG. 9 also includes a second graphical user interface 950 at a second later time after the selected node from the second hierarchy tree has been selected. The node 952 of the second hierarchy tree and the nodes 920-922 of the first hierarchy tree are removed. The line 954 is moving up (removing the second hierarchy tree) and fading out. A new level (that includes nodes 902-912) at the highest level of the first hierarchy tree is also fading in. The previously highest level (that includes nodes 914-918) in the first hierarchy tree is animatingly moved down in the first hierarchy tree (downward and to the right). FIG. 9 includes a third graphical user interface 960 at a third later time after the selected node from the second hierarchy tree has been selected. The line 954 is removed. The nodes 902-912 have completed being faded in. Also, nodes (the nodes 902-918) of the first hierarchy tree have been animatingly moved upward and to the left (replacing the second hierarchy tree). With reference to FIG. 13, the node 1312 of the second hierarchy tree is the selected node. Returning to FIG. 8, the method 800 continues at block 806.

At block 806, the tree module 102 animatingly fades out the selected node from the second hierarchy tree on the display 110. With reference to the transition from FIG. 5 back to FIG. 4, the node 452/552 from the second hierarchy tree 450/550 is faded out from the second hierarchy tree 450/550. With reference to FIG. 9, the node 952 is faded out.

Figure 14:
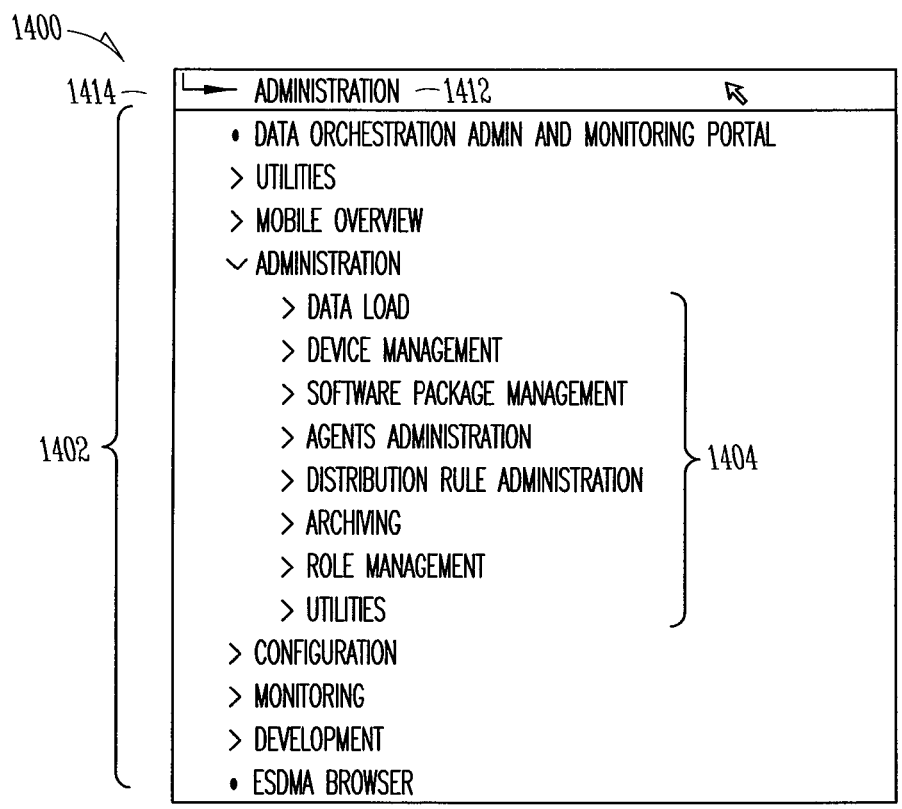
FIG. 14 is a screen shot of a graphical user interface of a hierarchy tree having levels being displayed across two different hierarchy trees (after a selected node is selected from the second hierarchy tree), according to some example embodiments.

To further illustrate, FIG. 14 is a screen shot of a graphical user interface of a hierarchy tree having levels being displayed across two different hierarchy trees (after a selected node is selected from the second hierarchy tree), according to some example embodiments. A screen shot 1400 shows the first hierarchy tree with N number of levels (N equaling two in this example). The first hierarchy tree includes a first level 1402 and a second level 1404. A second hierarchy tree is in section 1414 in the screen shot 1400. The second hierarchy tree includes a node 1412 (which is the selected node in the second hierarchy tree). As shown, the node 1412 (the selected node) is fading out from the second hierarchy tree. Returning to FIG. 8, the method 800 continues at block 808.

At block 808, the tree module 102 animatingly fades out nodes at a lowest level of the first hierarchy tree on the display 110. With reference to the transition from FIG. 5 back to FIG. 4, the nodes 520-522 are faded out from the first hierarchy tree 500 such that the nodes 520-522 are not present in the first hierarchy tree 400 in FIG. 4. With reference to FIG. 9, the nodes 920-922 are faded out. The method 800 continues at block 810.

At block 810, the tree module 102 animatingly moves nodes in the number of levels remaining in the first hierarchy tree down one level on the display 110. With reference to the transition from FIG. 5 back to FIG. 4, the nodes 414-418 are moved down one level (at the level previously occupied by the nodes 520-522 that had been faded out). With reference to FIG. 9, the nodes 914-918 are animatingly moved down in the first hierarchy tree (see transition from the first graphical user interface 900 to the second graphical user interface 950). With reference to the transition from FIG. 13 to FIG. 14, the nodes at the level 1304 of FIG. 13 are animatingly move down (as shown by the level 1404 of FIG. 14). The method 800 continues at block 812.

At block 812, the tree module 102 animatingly fades in nodes in the level that includes the selected node from the second hierarchy tree into the first hierarchy tree above the number of levels remaining in the first hierarchy tree on the display 110. With reference to the transition from FIG. 4 to FIG. 3, the selected node is the node 452 that is shown fading in as the node 408 in the first hierarchy tree 400. The nodes 402-412 are the nodes at the level of the selected node (the node 408). As shown in FIG. 3, the nodes 302-312 (corresponding to the nodes 402-412 of FIG. 4) are faded into the highest level of the first hierarchy tree 300 above the nodes in the remaining levels of the first hierarchy tree 300 (the nodes 314-318). With reference to FIG. 9, the nodes 902-912 are faded in to the first hierarchy tree (see transition from the second graphical user interface 950 to the third graphical user interface 960).

Figure 15:
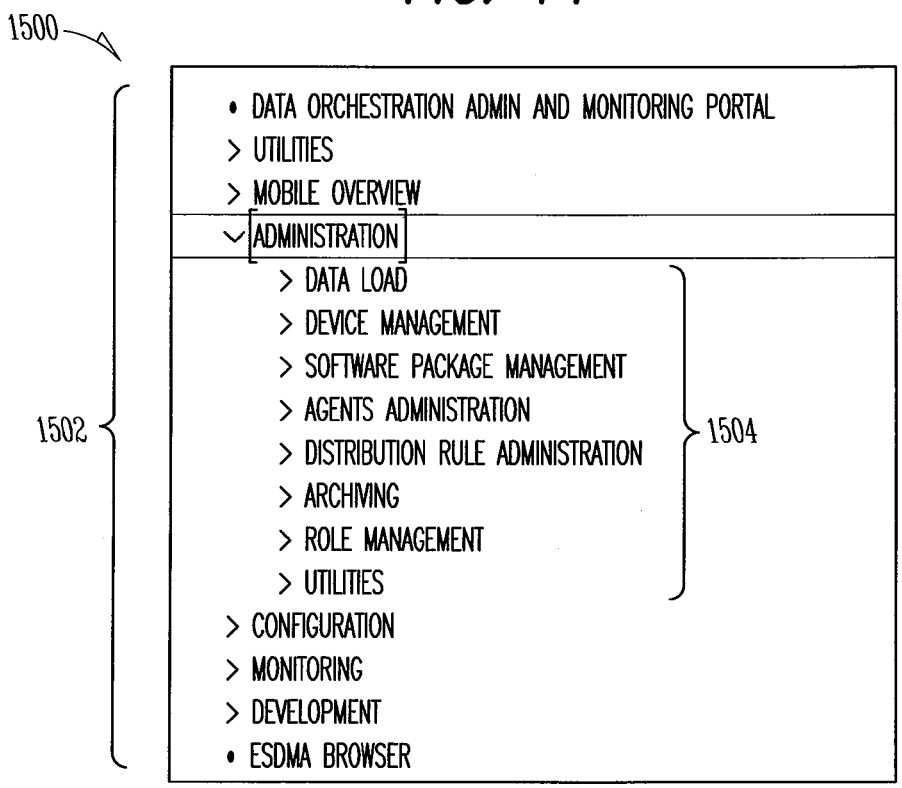
FIG. 15 is a screen shot of a graphical user interface of a hierarchy tree having N number of levels (after a selected node is selected from the second hierarchy tree), according to some example embodiments.

To further illustrate, FIG. 15 is a screen shot of a graphical user interface of a hierarchy tree having N number of levels (after a selected node is selected from the second hierarchy tree), according to some example embodiments. A screen shot 1500 shows the first hierarchy tree having a first level 1502 and a second level 1504. As shown, the nodes in the first level 1502 have completed being faded in. Also, the nodes in the first level 1502 and the second level 1504 have animatingly moved upward and to the left (compare to the screen shot 1400 of FIG. 14).

Additional animation can occur. For example, if there are no nodes remaining in the second hierarchy tree, the second hierarchy tree can be animatingly faded out so that only the first hierarchy tree remains on the display 110. The method 800 is completed.

FIGS. 2 and 8 illustrate different animation operations. In some example embodiments, all or some of the animations can be simultaneously in part. For example, the animating to fade in, fade out or move nodes, forming or collapsing of hierarchy trees can be performed at least simultaneously in part relative to each other.

Figure 16:
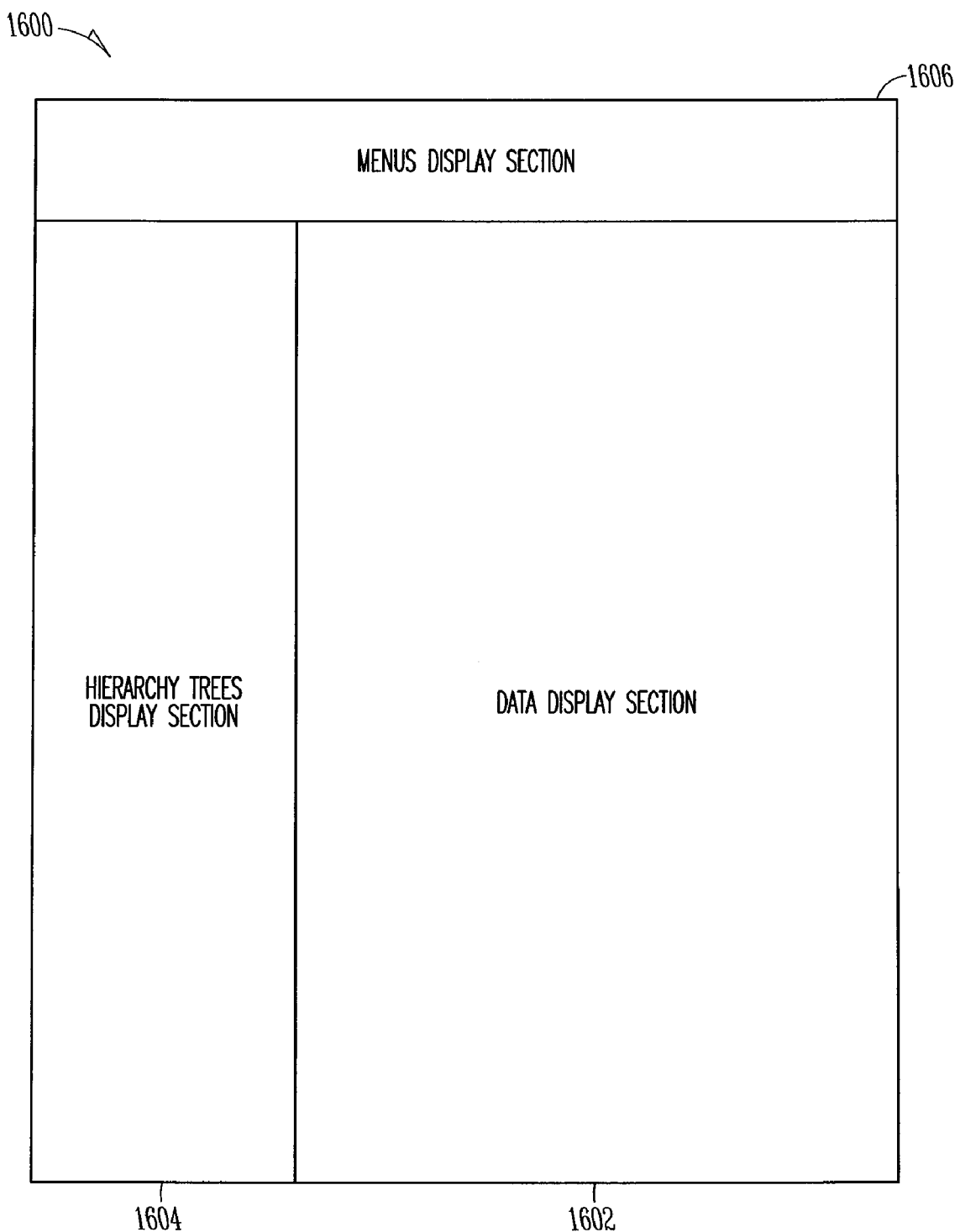
FIG. 16 is a graphical user interface of an application that provides limited display area for a hierarchy tree, according to some example embodiments.

Some example embodiments have particular application where the amount of display area for the hierarchy tree is limited. FIG. 16 is a graphical user interface of an application that provides limited display area for a hierarchy tree, according to some example embodiments. A display 1600 includes three different display sections. A data display section 1602 can display various types of data (such as documents, computer code, graphics, etc.). The hierarchy trees display section 1604 can display one or more hierarchy trees as described herein. In some example embodiments, a given node on one of the hierarchy trees can be associated with the data being displayed in the data display section 1602. Accordingly, a viewer can cause different data to be displayed in the data display section 1602, depending on which node is selected. A third display section can include the menus display section 1606 to provide pull-down menus, buttons and other types of controls selectable by the user of the application. Therefore, as shown, some example embodiments can be used so that a large part of the display is used for displaying actual data, while still enabling a viewer to animatingly view changes in a hierarchy tree across multiple hierarchy trees in a limited display area, according to some example embodiments.

Figure 17:
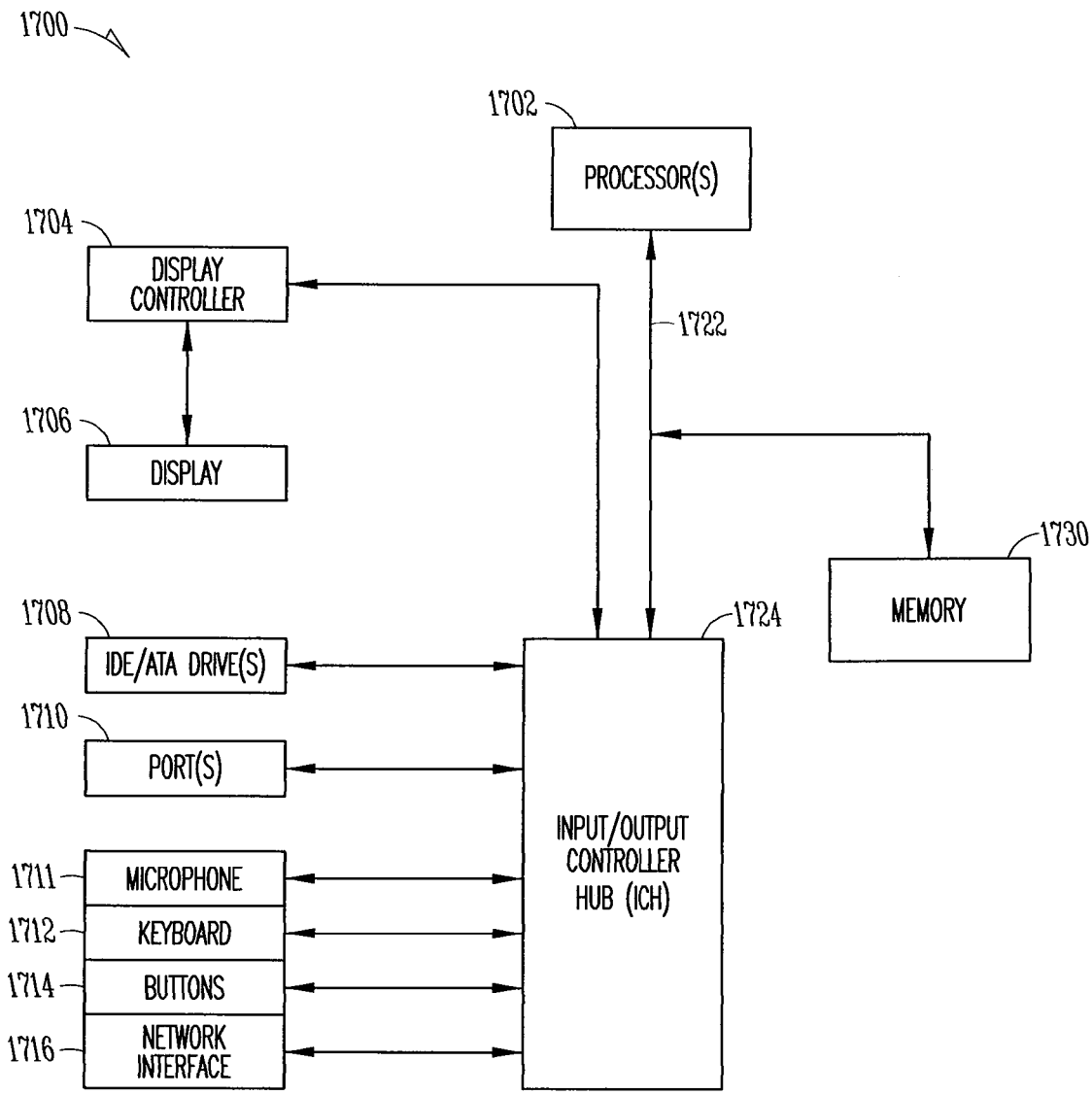
FIG. 17 is a computer device that executes software for performing operations related to performing movement in a hierarchy tree using multi-tree animation, according to some example embodiments.

Some example embodiment wherein software performs operations related to performing multi-tree animation as described herein is now described. In particular, FIG. 17 is a computer device that executes software for performing operations related to performing movement in a hierarchy tree using multi-tree animation, according to some example embodiments. FIG. 17 illustrates a computer device 1700 that may be representative of at least part of the system 100.

As illustrated in FIG. 17, a computer device 1700 comprises processor(s) 1702. The computer device 1700 also includes a memory 1730, a processor bus 1722, and an input/output controller hub (ICH) 1724. The processor(s) 1702, the memory 1730, and the ICH 1742 are coupled to the processor bus 1722. The processor(s) 1702 may comprise any suitable processor architecture. The computer device 1700 may comprise one, two, three, or more processors, any of which may execute a set of instructions in accordance with some example embodiments.

The memory 1730 stores data and/or instructions, and may comprise any suitable memory, such as a random access memory (RAM). For example, the memory 1730 may be a Static RAM (SRAM), a Synchronous Dynamic RAM (SDRAM), DRAM, a double data rate (DDR) Synchronous Dynamic RAM (SDRAM), etc. A display controller 1704 controls the display of information on a display 1706, according to some example embodiments.

The ICH 1724 provides an interface to Input/Output (I/O) devices or peripheral components for the computer device 1700. The ICH 1724 may comprise any suitable interface controller to provide for any suitable communication link to the processor(s) 1702, the memory 1730 and/or to any suitable device or component in communication with the ICH 1724. For some example embodiments, the ICH 1724 provides suitable arbitration and buffering for each interface.

In some example embodiments, the ICH 1724 provides an interface to one or more suitable Integrated Drive Electronics (IDE)/Advanced Technology Attachment (ATA) drive(s) 1708, such as a hard disk drive (HDD). In some example embodiments, the ICH 1724 also provides an interface to a keyboard 1712, a mouse 1714, one or more suitable devices through ports 1716-1718 (such as parallel ports, serial ports, Universal Serial Bus (USB), Firewire ports, etc.). In some example embodiments, the ICH 1724 also provides a network interface 1720 though which the computer device 1700 may communicate with other computers and/or devices.

With reference to the system 100, the memory 1730 and/or one of the IDE/ATA drives 1708 can store the documents, files, etc. In some example embodiments, the tree module 102 is a set of instructions executing within the processor(s) 1702. Therefore, the tree module 102 can be stored in a machine-readable medium that are a set of instructions (e.g., software) embodying any one, or all, of the methodologies described herein. For example, the tree module 102 can reside, completely or at least partially, within the memory 1730, the processor(s) 1702, one of the IDE/ATA drive(s) 1708, etc.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that some example embodiments can be practiced without such specific details. In other instances, control structures, gate level circuits and full software instruction sequences have not been shown in detail in order not to obscure example embodiments. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments include features, methods or processes that may be embodied within machine-executable instructions provided by a machine-readable medium. In some example embodiments, a machine-readable medium includes volatile and/or non-volatile media (e.g., read only memory (ROM), random access memory (RAM), magnetic disk storage media, optical storage media, flash memory devices, etc.), etc.).

Such instructions are utilized to cause a general or special purpose processor, programmed with the instructions, to perform methods or processes of the embodiments. Alternatively, the features or operations of embodiments are performed by specific hardware components which contain hard-wired logic for performing the operations, or by any combination of programmed data processing components and specific hardware components. Embodiments include software, data processing hardware, data processing system-implemented methods, and various processing operations, further described herein.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method executable by a processor of a computer, the method comprising:

displaying nodes in N number of levels of a first hierarchy tree on a display;

receiving input of a selected node of the nodes to open a level below the N number of levels of the first hierarchy tree;

fading out nodes in a level of the N number of levels above the level that includes the selected node from the first hierarchy tree on the display;

forming a second hierarchy tree on the display;

fading in a parent node of the selected node into the second hierarchy tree on the display;

fading in nodes in the level below the N number of levels of the first hierarchy tree into a level in the first hierarchy tree below levels remaining in the first hierarchy tree on the display; and sequentially moving at least one node of the nodes in the N number of levels remaining in the first hierarchy tree up in the first hierarchy tree on the display;

wherein at least one of a velocity and an acceleration of the fading out nodes in the level of the N number of levels, fading in the parent node and the fading in nodes in the level below the N number of levels decreases as a complexity of the first hierarchy tree increases.

2. The method of claim 1, wherein the sequentially moving of the at least one node of the nodes in the N number of levels remaining in the first hierarchy tree up in the first hierarchy tree on the display comprises animatingly moving the at least one node of the nodes in the N number of levels remaining in the first hierarchy tree up in the first hierarchy tree on the display.

3. The method of claim 1, further comprising sequentially moving at least one node in a number of levels in the second hierarchy tree up one level on the display.

4. The method of claim 1, wherein fading in the parent node into the second hierarchy tree on the display comprises moving the parent node into a lowest level in the second hierarchy tree on the display.

5. The method of claim 1, wherein fading out nodes in the level above the level that includes the selected node is performed at least simultaneously in part with fading in the parent node of the selected node into the second hierarchy tree on the display.

6. The method of claim 1, wherein N is 2.

7. The method of claim 1, wherein the sequentially moving the at least one node of the nodes in the N number of levels remaining in the first hierarchy tree up in the first hierarchy tree on the display comprises:

sequentially moving the at least one node of the nodes in the N number of levels remaining in the first hierarchy tree down on the display; and sequentially moving the at least one node of the nodes in the N number of levels remaining in the first hierarchy tree back up and to the right to a position below the second hierarchy tree on the display.

8. The method of claim 1, further comprising:
receiving input of a different selected node within a level in the second hierarchy tree on the display;
fading out the different selected node within the level in the second hierarchy tree on the display;
fading out nodes at a lowest level in the first hierarchy tree on the display;
sequentially moving the at least one node of the nodes in the number of levels remaining in the first hierarchy tree down in the first hierarchy tree on the display; and
fading in nodes in the level that includes the different selected node into a level above the number of levels remaining in the first hierarchy tree on the display.

9. The method of claim 8, wherein the sequentially moving the at least one node of the nodes in the number of levels remaining in the first hierarchy tree down in the first hierarchy tree on the display comprises:

sequentially moving the at least one node of the nodes in the N number of levels remaining in the first hierarchy tree down and to the right on the display; and sequentially moving the at least one node of the nodes in the N number of levels remaining in the first hierarchy tree back up on the display, wherein at least a part of the first hierarchy tree has replaced the second hierarchy tree on the display.

10. A machine-readable storage medium that provides instructions which, when executed by a machine, cause said machine to perform operations including:

displaying nodes in N number of levels of a first hierarchy tree on a display;

receiving input of a selected node of the nodes to open a level below the N number of levels of the first hierarchy tree;

fading out a number of nodes at a highest level of the N number of levels from the first hierarchy tree;

fading in at least one node of the number of nodes at the highest level of the N number of levels into a second hierarchy tree; and fading in at least one node at a level below the selected node into the first hierarchy tree on the display;

wherein at least one of a velocity and an acceleration of the fading out of the number of nodes, the fading in of the at least one node of the number of nodes at the highest level and the fading in of the at least one node at the level below the selected node decreases as a complexity of the first hierarchy tree increases.

11. The machine-readable medium of claim 10, wherein fading in at least one node of the highest level of the N number of levels into the second hierarchy tree comprises fading in a parent node of the selected node into the second hierarchy tree.

12. The machine-readable medium of claim 11, wherein fading in the parent node into the second hierarchy tree on the display comprises sequentially moving the parent node into a lowest level in the second hierarchy tree on the display.

13. The machine-readable medium of claim 10, wherein the operations further comprise sequentially moving nodes in the N number of levels remaining in the first hierarchy tree up in the first hierarchy tree on the display.

14. The machine-readable medium of claim 13, wherein the sequentially moving the nodes in the N number of levels remaining in the first hierarchy tree up in the first hierarchy tree on the display comprises:

sequentially moving the nodes in the N number of levels remaining in the first hierarchy tree down on the display; and sequentially moving the nodes in the N number of levels remaining in the first hierarchy tree back up and to the right to a position below the second hierarchy tree on the display.

15. The machine-readable medium of claim 10, wherein the operations further comprise sequentially moving nodes in a number of levels in the second hierarchy tree up one level on the display.

16. The machine-readable medium of claim 10, wherein the fading out the number of nodes at the highest level of the N number of levels from the first hierarchy tree is performed at least simultaneously in part with the fading in the at least one node of the number of nodes at the highest level of the N number of levels into the second hierarchy tree.

17. The machine-readable medium of claim 10, wherein N is 2.

18. An apparatus comprising:
a display configured to display a first hierarchy tree having nodes in N number of levels;
an input device configured to receive input of a selected node of the nodes to open a level below the N number of levels of the first hierarchy tree; and a tree module, in response to the selected node being received as input into the input device, configured to perform the following operations:

fade out a number of nodes at a highest level of the N number of levels from the first hierarchy tree on the display;

fade in at least one node of the number of nodes at the highest level of the N number of levels into a second hierarchy tree on the display; and fade in at least one node at a level below the selected node into the first hierarchy tree on the display;

wherein at least one of a velocity and an acceleration of the fading out of the number of nodes, the fading in of the at least one node of the number of nodes at the highest level and the fading in of the at least one node at the level below the selected node decreases as a complexity of the first hierarchy tree increases.

19. The apparatus of claim 18, wherein the at least one node of the number of nodes at the highest level faded into the second hierarchy tree comprises a parent node of the selected node.

20. The apparatus of claim 19, wherein the operation to fade in the parent node into the second hierarchy tree on the display comprises an operation to sequentially move the parent node into a lowest level in the second hierarchy tree on the display.

21. The apparatus of claim 18, wherein the operations further comprise an operation to sequentially move nodes in the N number of levels remaining in the first hierarchy tree up in the first hierarchy tree on the display.

22. The apparatus of claim 21, wherein the operation to sequentially move the nodes in the N number of levels remaining in the first hierarchy tree up in the first hierarchy tree on the display comprises:

an operation to sequentially move the nodes in the N number of levels remaining in the first hierarchy tree down on the display; and an operation to sequentially move the nodes in the N number of levels remaining in the first hierarchy tree back up and to the right to a position below the second hierarchy tree on the display.

23. The apparatus of claim 18, wherein the operations further comprise an operation to sequentially move nodes in a number of levels in the second hierarchy tree up one level on the display.

24. The apparatus of claim 18, wherein the operation to fade out the number of nodes at the highest level of the N number of levels from the first hierarchy tree is performed at least simultaneously in part with the operation to fade in the at least one node of the number of nodes at the highest level of the N number of levels into the second hierarchy tree.

25. The apparatus of claim 18, wherein the operation to fade in at least one node of the number of nodes at the highest level of the N number of levels into the second hierarchy tree on the display is performed at least simultaneously in part with the operation to fade in at least one node at a level below the selected node into the first hierarchy tree on the display.

26. An apparatus comprising:

an input device configured to receive input of a selected node of nodes in N number of levels of a first hierarchy tree, wherein the input is configured to open a level below the N number of levels of the first hierarchy tree; and a display comprising, a first display zone configured to display the first hierarchy tree;

a second display zone configured to display a second hierarchy tree, wherein, in response to receipt of the input of the selected node, nodes in a level of the N number of levels above the level that includes the selected node are faded out from the first hierarchy tree in the first display zone and a parent node of the selected node is faded into the second hierarchy tree in the second display zone;

wherein at least one of a velocity and an acceleration of the fading out of the number of nodes and the fading in of the parent node decreases as a complexity of the first hierarchy tree increases.

27. The apparatus of claim 26, wherein, in response to receipt of the input of the selected node, nodes in the N number of levels remaining in the first hierarchy tree are sequentially moved up in the first hierarchy tree in the first display zone.

28. The apparatus of claim 27, wherein the nodes in the N number of levels remaining in the first hierarchy tree are animatingly moved up in the first hierarchy tree in the first display zone.

29. The apparatus of claim 27, wherein the nodes in a level of the N number of levels above the level that includes the selected node are faded out from the first hierarchy tree in the first display zone and the parent node of the selected node is faded into the second hierarchy tree in the second display zone at least simultaneously in part.

* * * * *